United States Patent
Schwarz

(10) Patent No.: US 6,644,886 B2
(45) Date of Patent: Nov. 11, 2003

(54) CONNECTION ARRANGEMENT FOR THE DETACHABLE CONNECTION OF TWO COMPONENTS

(75) Inventor: Helmut Schwarz, Weil der Stadt (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 09/949,824

(22) Filed: Sep. 12, 2001

(65) Prior Publication Data

US 2002/0031400 A1 Mar. 14, 2002

(30) Foreign Application Priority Data

Sep. 13, 2000 (DE) .......................................... 200 15 848

(51) Int. Cl.⁷ ................................................. F16B 13/06
(52) U.S. Cl. ..................... 403/329; 403/408.1; 24/295; 411/45; 411/508
(58) Field of Search ................................. 403/315, 316, 403/317, 319, 408.1; 411/41, 45, 46, 485, 508, 509, 512; 24/294, 295, 297, 613, 635; 296/146.7

(56) References Cited

U.S. PATENT DOCUMENTS

| | | |
|---|---|---|
| 2,995,969 A | 8/1961 | Kraus et al. |
| 3,125,922 A | 3/1964 | Sauter |
| 3,896,698 A | 7/1975 | Aylott |
| 4,874,276 A * | 10/1989 | Iguchi ........................ 24/297 X |
| 4,952,106 A * | 8/1990 | Kubochi et al. ........ 411/508 X |
| 5,100,272 A * | 3/1992 | Jadoul et al. .................. 411/45 |
| 6,334,750 B1 * | 1/2002 | Hsieh .......................... 411/508 |
| 6,409,446 B1 * | 6/2002 | Schwarz |
| 6,443,679 B1 * | 9/2002 | Schwarz |

FOREIGN PATENT DOCUMENTS

DE          29920498          3/2000

* cited by examiner

*Primary Examiner*—Greg Binda
(74) *Attorney, Agent, or Firm*—Greenblum & Bernstein, P.L.C.

(57) ABSTRACT

Connection arrangement for detachably connecting a first component with a second component, the first and second components having aligned openings. The arrangement includes a retaining bolt including an internal opening. At least one side wall opening and an external ring-shaped retaining groove is provided. The retaining bolt is adapted to be connected to the first component. A retaining-spring arrangement is provided having at least one leaf-spring arm and being adapted to be connected to the second component. The ring-shaped retaining groove of the retaining bolt is adapted to extend through the aligned opening of the second component. A free end of the at least one leaf-spring arm is engagable with the ring-shaped retaining groove. A movable disengaging element is provided and is adapted to disengage the at least one leaf-spring arm from the retaining groove of the retaining bolt. A detent pin is movably disposed in the internal opening of the retaining bolt and is engagable with the detaching element via the at least one side-wall opening.

16 Claims, 10 Drawing Sheets

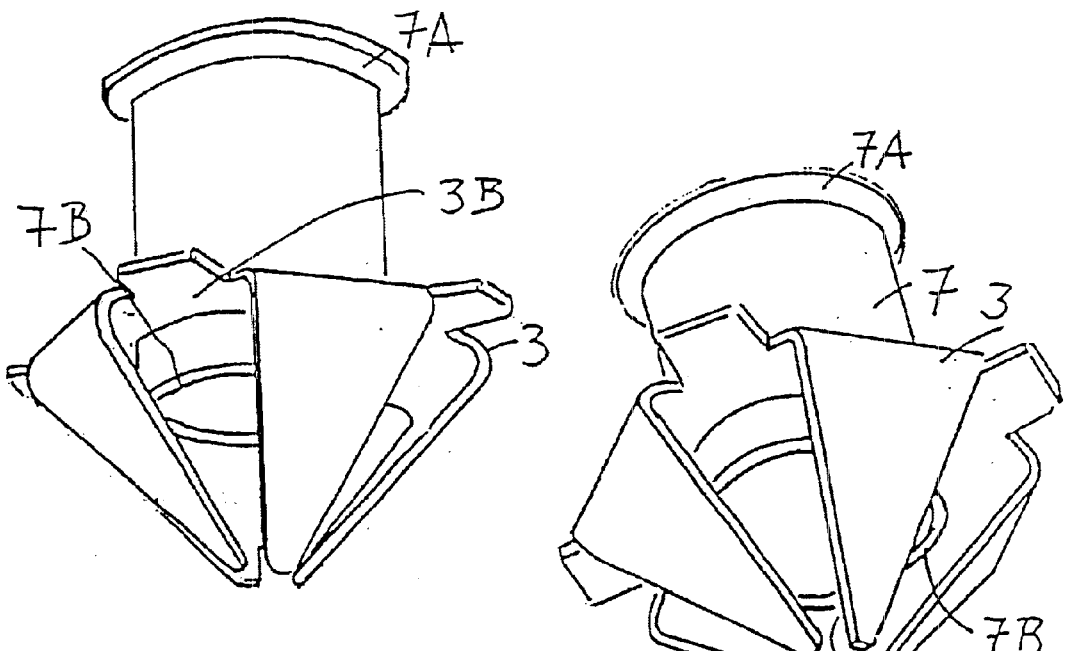
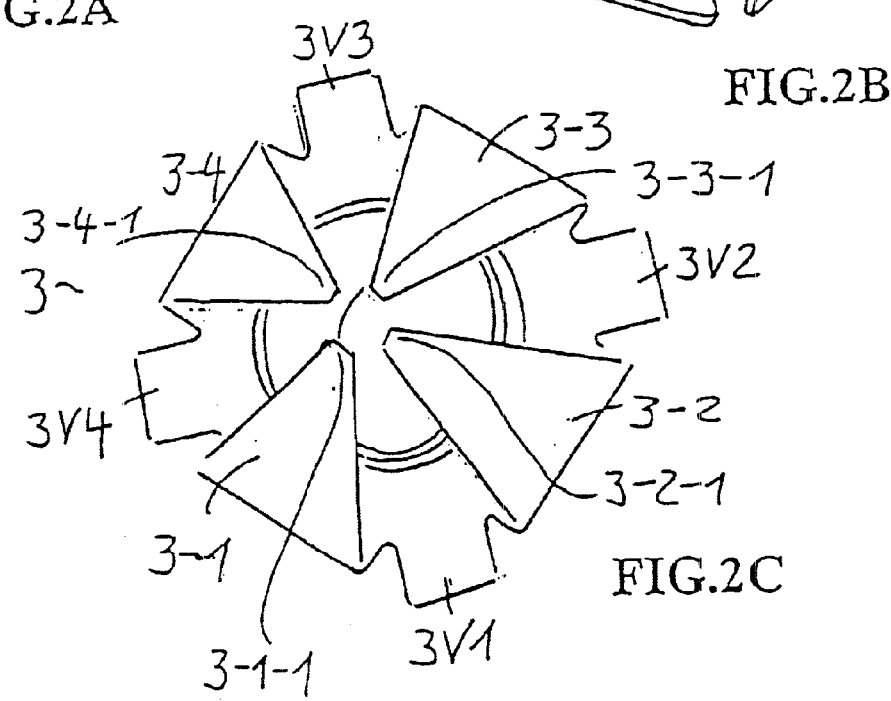

CONNECTION ARRANGEMENT FOR THE DETACHABLE CONNECTION OF TWO COMPONENTS

CROSS-REFERENCE TO RELATED APPLICATIONS

The present application claims priority under 35 U.S.C. §119 of German Patent Application No. 200 15 848.1, filed on Sep. 13, 2000, the disclosure of which is expressly incorporated by reference herein in its entirety.

BACKGROUND OF THE INVENTION

1. Field of the Invention

The invention concerns a connection arrangement for the detachable connection of two components with a retaining pin, a retaining-spring arrangement, a disengaging element and a detent pin, where the disengaging element is mounted movably on the retaining pin and which is actuated by the detent pin which is axially movable in the retaining pin.

2. Discussion of Background Information

A connection arrangement of this type is known in the prior art and is described in German utility model 299 204 98.7.

Such a prior art connection arrangement is shown in FIGS. 12A, 12B, 12C. This connection arrangement is used for the detachable connection of two components with aligned openings in components MP1' and MP2'. A retaining pin or bolt B is located in a bush BU joined to the first component MP1'. This retaining pin projects through the opening of the second component MP2'. At its end, the retaining bolt B has a ring-shaped retaining groove H, into which the ends of the free leaf-spring arms F1 and F2 engage when the retaining bolt B is pressed into a leaf-spring arrangement F joined to the second component MP2'. By utilizing a transverse ridge V, a detent pin S is permanently attached to the disengaging element E, which is located movably on the retaining bolt B.

The transverse ridge V passes through window-like openings W in the wall of the retaining pin B, wherein the openings serve as a guiding track.

In order to connect both components MP1' and MP2', the retaining bolt B with its tapered tip is pressed in a direction U. This causes the ends of the leaf springs F1 and F2 to widen outwardly until they engage in the retaining groove H.

A vibration-damping ring R has a peripheral bulge with a groove N for receiving the second component MP2'. The edge of the opening in the second component MP2' fits into this groove N.

FIG. 12C illustrates the attachment of the disengaging element E, located outside the retaining bolt B to the detent pin S guided within the retaining bolt B.

The disengaging element E is attached permanently to the transverse ridge V which is guided in the window-like recess W (FIG. 12B) of the retaining-bolt wall. The transverse ridge V is fixed to the detent pin S by way of a fastening pin P permanently fixed to transverse ridge V. The fastening pin P is inserted permanently in a hole in the detent pin S.

The ring-shaped retaining groove H functions with a leaf-spring arrangement which requires at least two and preferably three leaf-spring arms distributed as evenly as possible around the circumference.

The arms of the leaf springs taper towards their free end. They have a common base (see FIG. 5, DE 299 204 98.7).

When the detent pin S moves in the retaining bolt B, the disengaging element E moves on the retaining bolt as far as the length of the window-like opening W permits.

To release the connection arrangement for the two components MP1' and MP2', (one component is connected with the retaining bolt B, the other directly or indirectly with the leaf-spring arrangement F), the detent pin S in the retaining bolt B is pressed in direction U until the disengaging element E widens the ends of the leaf-spring arms F1 and F2 out of the retaining groove H (or more accurately, out of the engagement area).

To ensure easy widening of the ends of the leaf springs F1 and F2, it is important that these can slide smoothly along the taper of the retaining bolt B under increasing spring pressure without encountering any undesirable resistance from edges, gaps, shoulders etc.

In addition to quick assembly, a connection arrangement of this kind also has the advantage of allowing easy dismantling of components for repair and maintenance purposes.

Connection arrangements of this kind are most commonly used for fastening interior paneling in vehicles and aircraft.

However, the above arrangement, according to the prior art, has the disadvantage of being costly and time-consuming to design.

To avoid such disadvantages, the object of the invention is to provide an improved connection arrangement.

SUMMARY OF THE INVENTION

The invention provides a particularly effective and easily manufactured leaf-spring arrangement for such a connection arrangement as well as for other arrangements with a ring-shaped retaining groove.

Furthermore, the invention provides for a connection arrangement which damps vibrations.

Accordingly, the invention provides for a connection arrangement for detachably connecting a first component with a second component, the first and second components having aligned openings, the arrangement comprising a retaining bolt including an internal opening, at least one side wall opening and an external ring-shaped retaining groove, the retaining bolt being adapted to be connected to the first component, a retaining-spring arrangement having at least one leaf-spring arm and being adapted to be connected to the second component, the ring-shaped retaining groove of the retaining bolt being adapted to extend through the aligned opening of the second component, a free end of the at least one leaf-spring arm being engagable with the ring-shaped retaining groove, a movable disengaging element being adapted to disengage the at least one leaf-spring arm from the retaining groove of the retaining bolt, and a detent pin being movably disposed in the internal opening of the retaining bolt and being engagable with the detaching element via the at least one side-wall opening.

A portion of the detent pin may be adapted to directly engage a portion of the disengaging element in the area of the side-wall opening. The detent pin may be adapted to engage a portion of the disengaging element which extends within the internal opening of the retaining bolt. An end of the detent pin may be adapted to project through the side-wall opening. A portion of the detaching element may project into the internal opening of the retaining bolt via the side-wall opening. The disengaging element may comprise a deformed hollow cylinder. The retaining-spring arrangement may comprise a base part and at least two leaf-spring arms extending therefrom and each of the at least two leaf-spring arms may be tapered towards the ring-shaped retaining groove and is engagable via the disengaging element. The base part may comprise projections which extend outwardly and may be adapted to extend over the aligned opening of the second component.

The retaining-spring arrangement may comprise a single piece construction. The retaining-spring arrangement may be formed from spring-steel plate.

The arrangement may further comprise a bushing arranged in a central opening of the retaining-spring arrangement. The bushing may comprise at least one flange or shoulder.

The arrangement may further comprise a vibration-damping ring. The vibration-damping ring comprises an elastic material. The vibration-damping ring may be mounted to the aligned opening of the second component via a peripheral groove.

The arrangement may further comprise a bushing arranged in a central opening of the vibration-damping ring and the bushing may be adapted to secure the retaining-spring arrangement to the second component.

The invention also provides for a connection arrangement for detachably connecting two components having aligned openings, the arrangement comprising a retaining bolt adapted to be coupled to one component via the aligned opening and adapted to project through the aligned opening of other component, the retaining bolt having a retaining mechanism comprising one of a groove or a ring-shaped engaging area. A retaining-spring arrangement is adapted to be coupled to the other component and includes at least one leaf-spring arm which engages the retaining mechanism. A movable disengaging element comprises a projection and is arranged to move on the retaining bolt and is adapted to disengage the at least one leaf-spring arm from the retaining groove of the retaining bolt. A detent pin comprises a recess and is movably mounted within the retaining bolt and is adapted to project through a side opening of the retaining bolt. The projection of the disengaging element is engagable with the recess of the detent pin via the side opening. The disengaging element is movable by the detent pin.

The side opening may comprise a window-like recess. The projection of the disengaging element may comprise a spring hook and the recess of the detent pin may comprise a ring groove. The side opening may comprise a slot which extends to an end of the retaining bolt. The projection of the disengaging element may comprise at least one tappet which projects through the slot. The retaining-spring arrangement may comprise a base part and at least two leaf-spring arms extend therefrom and each of the at least two leaf-spring arms may be tapered towards the retaining mechanism and is engagable via the disengaging element.

The invention still further provides for a connection arrangement for detachably connecting a first component with a second component, the first and second components having aligned openings, the arrangement comprising a retaining bolt including a head end, an internal opening, at least one side wall opening, and a pin end having an external ring-shaped retaining groove. The retaining bolt is adapted to be secured to the first component. A retaining-spring arrangement has a plurality of spring arms and is adapted to be secured to the second component. The ring-shaped retaining groove of the retaining bolt is adapted to extend through the aligned opening of the second component. The plurality of spring arms are engagable with the ring-shaped retaining groove of the retaining bolt. A movable disengaging element is adapted to disengage the spring arms from the retaining groove of the retaining bolt. A detent pin is movably mounted in the internal opening of the retaining bolt and is engagable with the detaching element via the at least one sidewall opening. A mechanism is provided for biasing the head end of the retaining bolt away from the first component when the retaining bolt is secured to the first component.

The invention also provides for a connection arrangement for detachable connection of two components containing openings aligned with one another. A retaining bolt is located in the hole of one of the components being joined, projects through the opening of the other component and has a ring-shaped retaining groove or a ring-shaped engaging area. The retaining bolt is adapted to be pressed into a retaining-spring arrangement connected to the second component. The free end of at least one leaf-spring arm engages the groove. A movable disengaging element is arranged on the bolt for disengaging the leaf-spring arm in the retaining groove of the retaining bolt. A detent pin is arranged in the retaining bolt which is movable in an axial direction. The detaching element is adapted to be actuated in the area of an opening in the wall of the retaining bolt. The disengaging element is not permanently attached to the detent pin and the detent pin is movable in the direction of the retaining-spring arrangement. A part or a projection of the detent pin is adapted to project into the area of the wall-opening and the disengaging element or a projection on the same is adapted to project into the area of the wall-opening. The disengaging element can be moved through contact of the parts projecting into the area of the wall-opening or by projections on the detent pin with the parts projecting into the area of the wall-opening or projections on the disengaging element.

A part of the front edge of the detent pin may project into the opening in the wall and may be pressed against a deformed part of the detaching element projecting into the wall-opening. The disengaging element may be a deformed hollow cylinder, such that an end facing away from the ring-shaped retaining groove is pressed into the area of the wall-opening, and parts of the pressed-in disengaging element are aligned with parts of the front surface of the detent pin projecting into the recess space of the wall-opening. The retaining-spring arrangement may have a base part from whose outer edge at least two leaf-spring arms extend, which taper towards the free end and slope inwards in the manner of a roof, and whose free ends can engage in the ring-shaped retaining groove and can be widened by the disengaging element. The base part may have projections pointing outwardly, which extend over the intended opening of the second component forming a stop. The retaining-spring arrangement may be in one part. The retaining-spring arrangement may be made of spring-steel plate. The base part may have an opening in which a bush is located. The openings of the bush may have an edge pointing outwards. A vibration-damping ring of elastic material may be mounted (preferably by vulcanizing) on the bush, which has a peripheral groove concentric to its axis which is intended to receive the edge of the opening in the second component, preferably with a vulcanization connection.

The invention also provides for a connection arrangement for detachable connection of two components containing openings aligned with one another, wherein a retaining bolt is located in the hole of one of the components being joined, which projects through the opening of the other component, and has a ring-shaped retaining groove or a ring-shaped engaging area in which, when the retaining bolt is pressed into a retaining-spring arrangement connected to the second component, the free end of at least one leaf-spring arm engages. A movable disengaging element, for disengaging the leaf-spring arm in the retaining groove of the retaining bolt is provided on the retaining bolt. A detent pin movable in an axial direction is provided in the retaining bolt, by way of which the detaching element can be actuated in the area of an opening in the wall of the retaining bolt. The disengaging element is not permanently attached to the detent pin. The detent pin has recesses and the disengaging element has projections projecting through the wall-opening and which fit into the recesses. The disengaging element can be moved by the detent pin by way of projections.

The wall-opening may be a window-like recess. The projection of the disengaging element may be a spring hook and the recess of the detent pin may be a ring groove. The wall-opening may be a slot continuing to the end of the retaining bolt. The projection of the disengaging element may be tappets projecting through the slot aligned towards the axis, and the recess of the detent pin may be a ring groove. The retaining-spring arrangement may be formed in one part and may have a base part from whose outer edge at least two leaf-spring arms extend, which taper towards the free end and slope inwardly in the manner of a roof.

BRIEF DESCRIPTION OF THE DRAWINGS

The present invention is further described in the detailed description which follows, in reference to the noted drawings by way of non-limiting examples of embodiments of the present invention, and wherein:

FIGS. 2A, 2B, 2C are perspective drawings of a retaining-spring arrangement with a bush or bushing similar to a hollow cylinder for receiving a vibration-damping ring according to FIG. 8;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
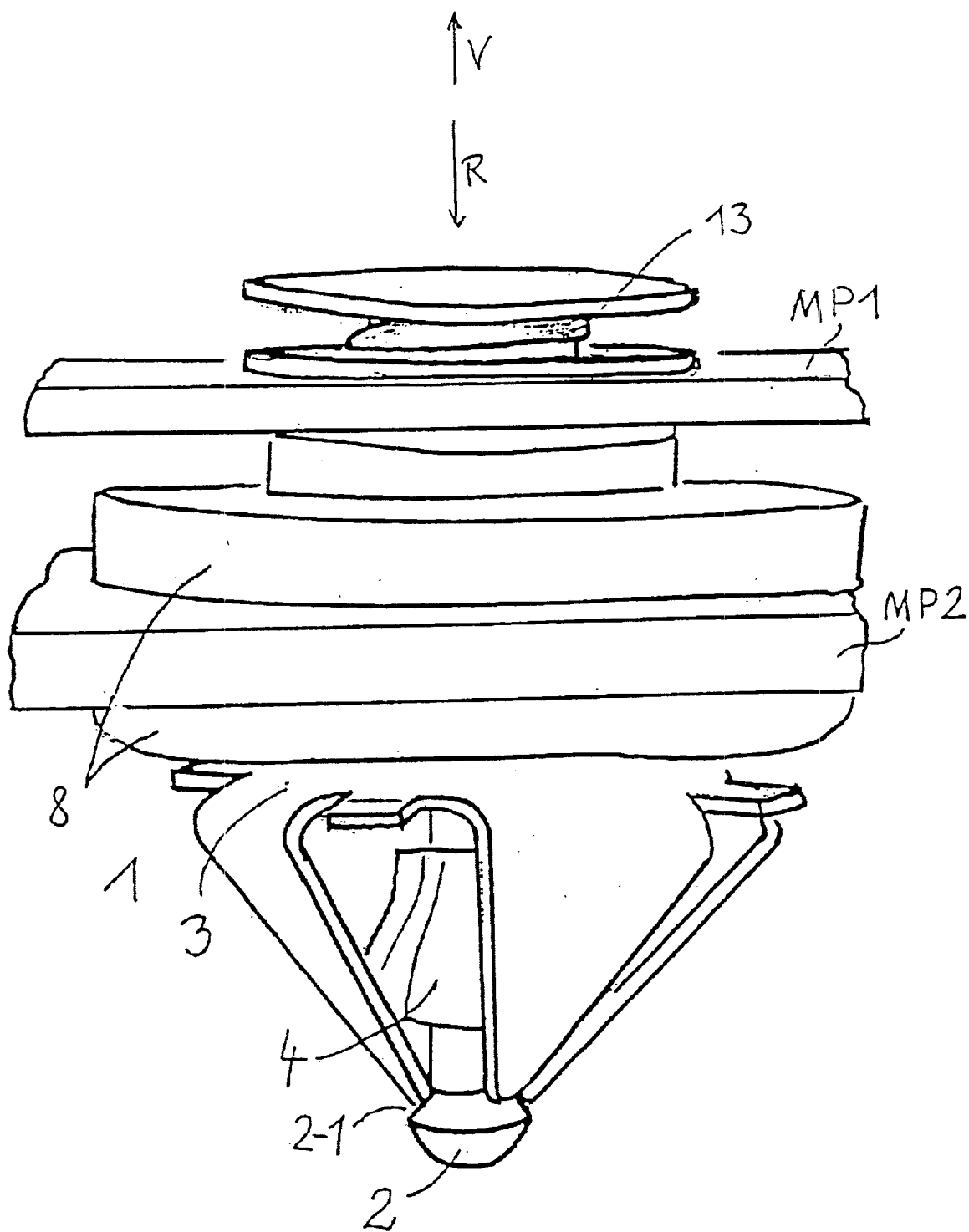
FIG. 1 is a schematic perspective drawing of the connection arrangement according to the invention, for the connection of two components, wherein the second component is supported by a vibration-damping ring.

FIG. 1 shows a schematic perspective drawing of a connection arrangement 1 according to the invention, for the connection of two components MP1 and MP2, where the second component MP2 is supported by a vibration-damping ring 8.

Figure 3A:
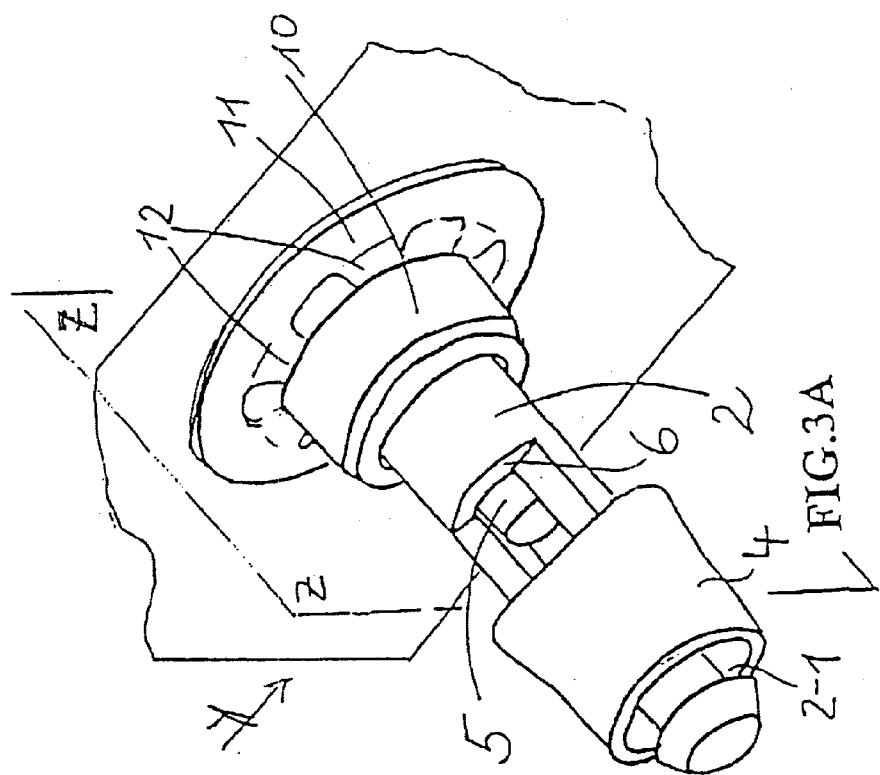
FIGS. 3A and 3B are perspective drawings of a retaining bolt and a disengaging element located movably thereon, which can be actuated by an axially movable detent pin arranged in the retaining bolt.
Figure 6:
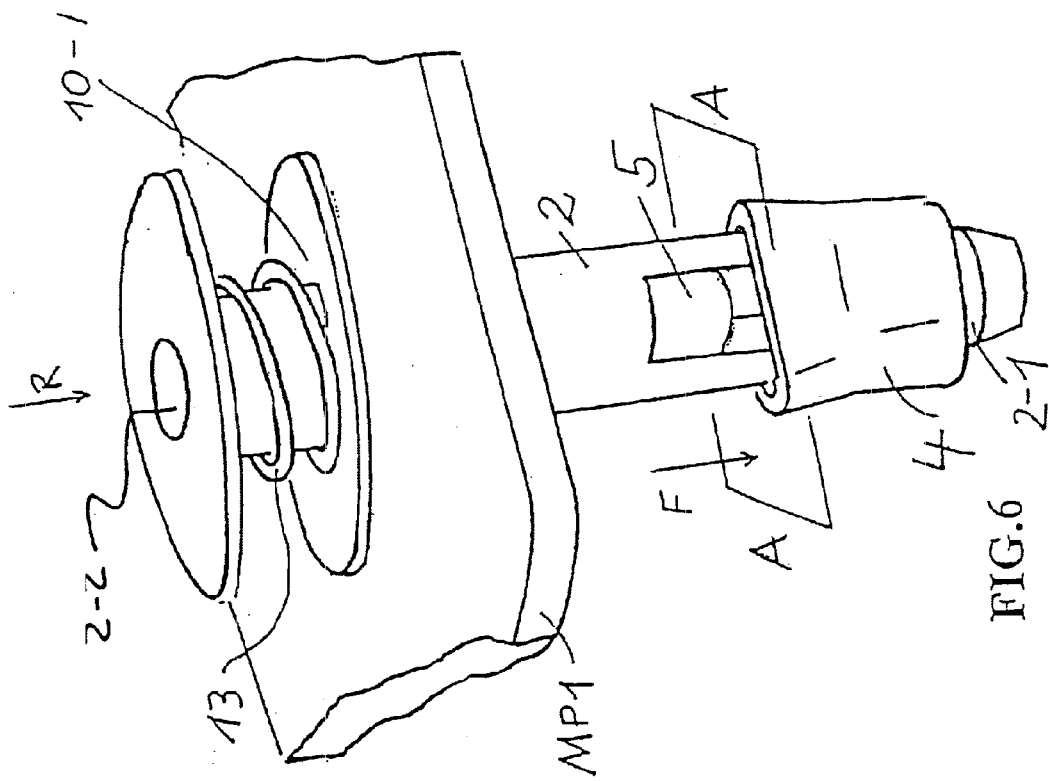
FIG. 6 is a perspective drawing of the retaining pin with a disengaging element connected to the first component.

A retaining bolt 2 is arranged and/or located in the first component MP1 as is shown in FIG. 3A and FIG. 6. A retaining-spring arrangement 3 lies against and/or is arranged underside of the vibration-damping ring 8. The free ends of the leaf-spring arms engage the "retaining groove" 2-1 (more precisely, an engagement area) of the retaining pin 2. A disengaging element 4 is located movably on the retaining bolt 2. This disengaging element 4 is actuated by a detent pin 5 (see FIG. 3A and FIG. 7) which is arranged for axial movement in the interior of the retaining bolt 2.

Movement of the disengaging element 4 in a direction R, causes the ends of the retaining-spring arms to be widened, thereby releasing the connection. A pressure spring 13 pushes the retaining bolt 2 in a direction V and the components can then be separated from one another.

The functioning and arrangement of the individual components of the various connection arrangements are shown in the other drawings.

FIGS. 2A, 2B and 2C show perspective drawings of a retaining-spring arrangement 3 which resembles a truncated cone and a roof with four leaf-spring arms 3-1, 3-2, 3-3 and 3-4.

Figure 8:
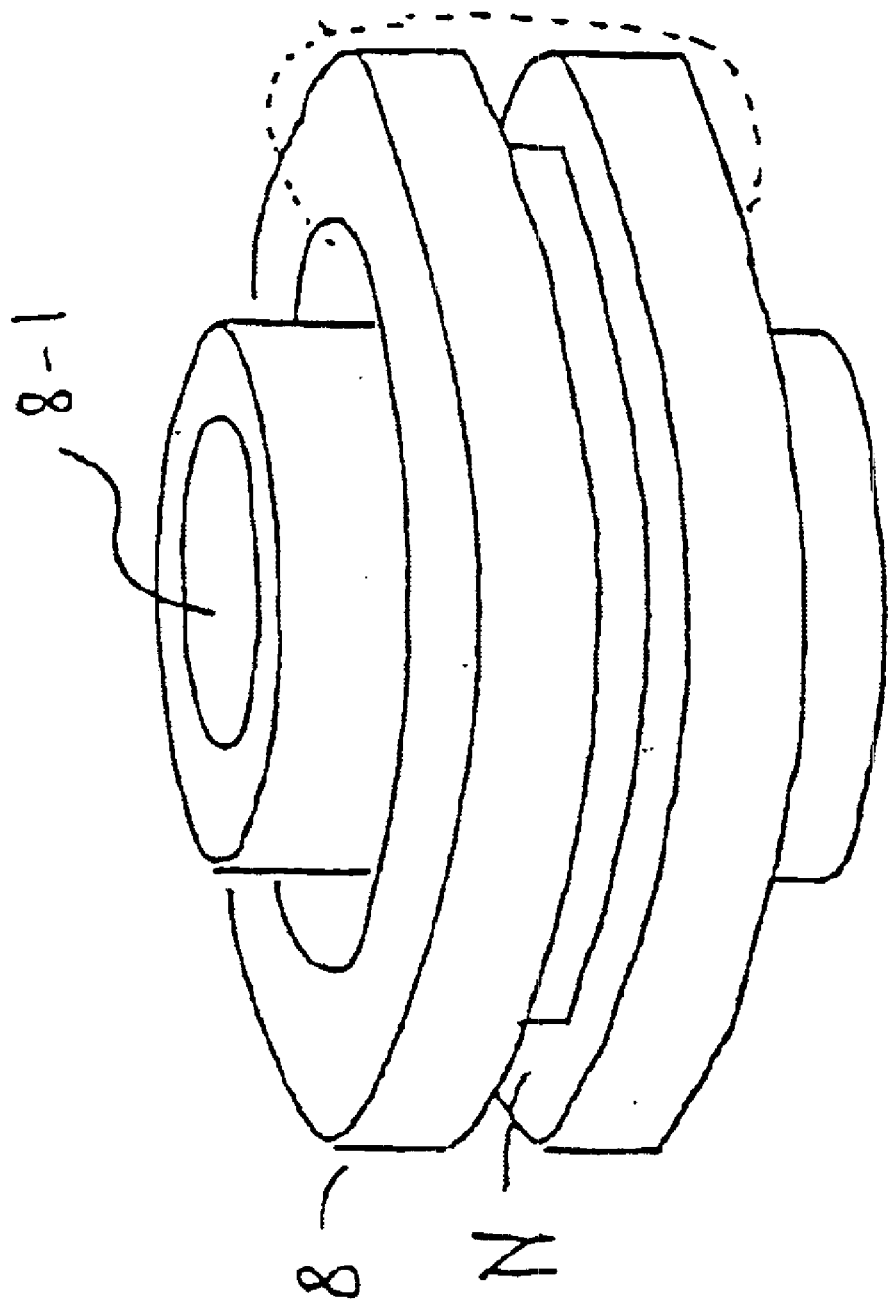
FIG. 8 is a perspective drawing of the vibration-damping ring.

The retaining-spring arrangement 3 has an optional bush or bushing 7 (for use with a vibration-damping ring 8) to receive the vibration-damping ring 8 shown in FIG. 8.

The retaining-spring arrangement 3 has a base part 3B, from whose outer edge four leaf-spring arms 3-1, 3-2, 3-3, 3-4 extend. These arms 3-1, 3-2, 3-3, 3-4 taper towards their free end and slope inwardly in the manner of a roof.

Free ends 3-1-1, 3-2-1, 3-3-1, 3-4-1 of the leaf-spring arms slope towards one another. They form the segments of an imaginary hollow truncated cone. Seen from above, the upper edges of their free end forms a ring segment to fit into the ring-shaped retaining groove 2-1 of the retaining bolt 2.

The free ends 3-1-1, 3-2-1, 3-3-1, 3-4-1 engage the ring-shaped retaining groove 2-1 of the retaining bolt 2 as soon as this is pressed in the direction of the arrow R (see FIG. 1) into the retaining-spring arrangement 3. When the head of the retaining bolt 2 passes through the spring arrangement 3, the free ends of the leaf-spring arms spring outwardly until they "lock into" the retaining groove 2-1. The base part 3B present in this variant of the invention has projections 3V1, 3V2, 3V3 and 3V4 which point outwardly.

In the assembled state of the connection arrangement, these projections serve as a stop mechanism with reference to the opening in the second component MP2, to prevent the vibration-damping ring 8 and particularly the retaining-spring arrangement 3, from being pulled through the opening in the second component MP2 when subjected to a pulling force in a direction V.

The retaining-spring arrangement 3 is preferably made as a single part or piece and manufactured from spring-steel plate.

The base part 3B of the retaining-spring arrangement 3 has a central opening to receive a bush 7 which resembles a hollow cylinder. In the assembled state, this bush 7 is located in an opening 8-1 of the vibration-damping ring 8 (see FIG. 8).

The ends of the bush 7 each have an edge 7A and 7B which extend outwardly. These ends are adapted to prevent the bush 7 from sliding out of the opening in the base part 3B of the retaining-spring arrangement 3. The vibration-damping ring 8 is designed to be located between the upper edge 7A of the bush 7 and the base 3B of the retaining-spring arrangement 3.

The vibration-damping ring 8 is preferably made of elastic material and has a peripheral groove N arranged concentrically relative to its axis. This groove N is adapted to receive the edge of the opening in the second component MP2.

The vibration-damping ring 8 is utilized to prevent the transmission of vibrations between the components MP1 and MP2. The vibrations are absorbed by the elasticity of the material of the vibration-damping ring and the ability of its narrow-necked bulge to vibrate.

Figure 3B:
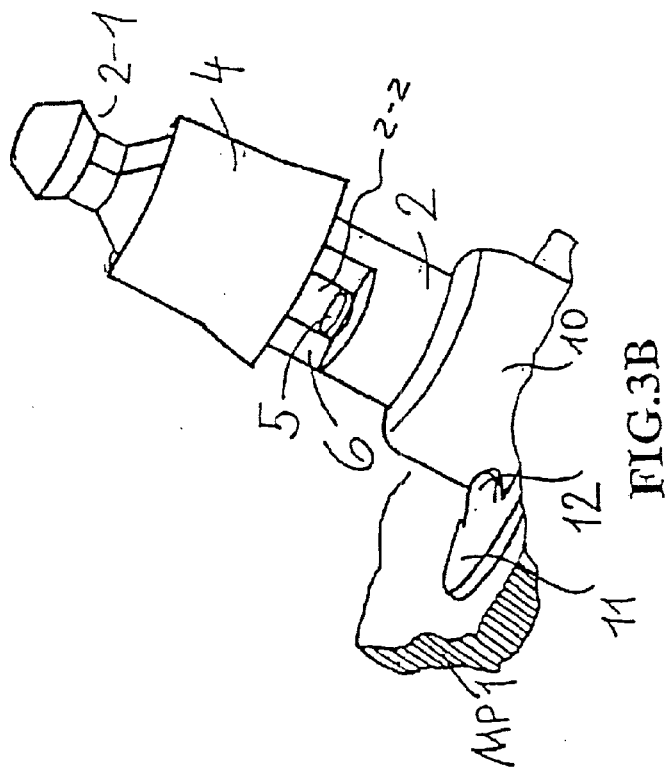

FIGS. 3A and 3B show perspective drawings of the retaining bolt 2 and a disengaging element 4 located movably thereon, which can be actuated by an axially movable detent pin 5 in the retaining bolt 2.

The retaining bolt 2 is guided in a bush or bushing 10 which is located in the opening of the first component MP1. This bush 10 has an outer edge 10-1 (see FIG. 6) on the upper side of the first component MP1. On the underside of the first component MP1, the bush is fixed by a locking ring 11 whose inwardly extending locking elements 12 engage in an outer retaining groove (not shown) of the bush 10. The retaining bolt 2 is guided in the bush 10.

The disengaging element 4 is located and/or arranged movably on the retaining bolt 2.

The retaining bolt 2 has an axial hole and/or opening 2-2 adapted and/or configured to receive a movable detent pin 5. In order to have a way of accessing the detent pin 5 from the outer side of the bolt 2, the retaining bolt 2 has two wall openings 6 arranged opposite one another. These are designed and/or configured in such a way that parts of the front surface of the detent pin 5 project into the recess space 6 of the wall openings in order to act on the disengaging element 4.

The disengaging element 4 is a deformed element and/or shaped like a hollow cylinder, of which the end facing away from the ring-shaped retaining groove 2-1 is pressed into the area of the wall-openings 6, and parts of the pressed-in disengaging element 4 are aligned with parts of the front surface of the detent pin 5 projecting into a recess space of the wall-openings 6.

Figure 4A:
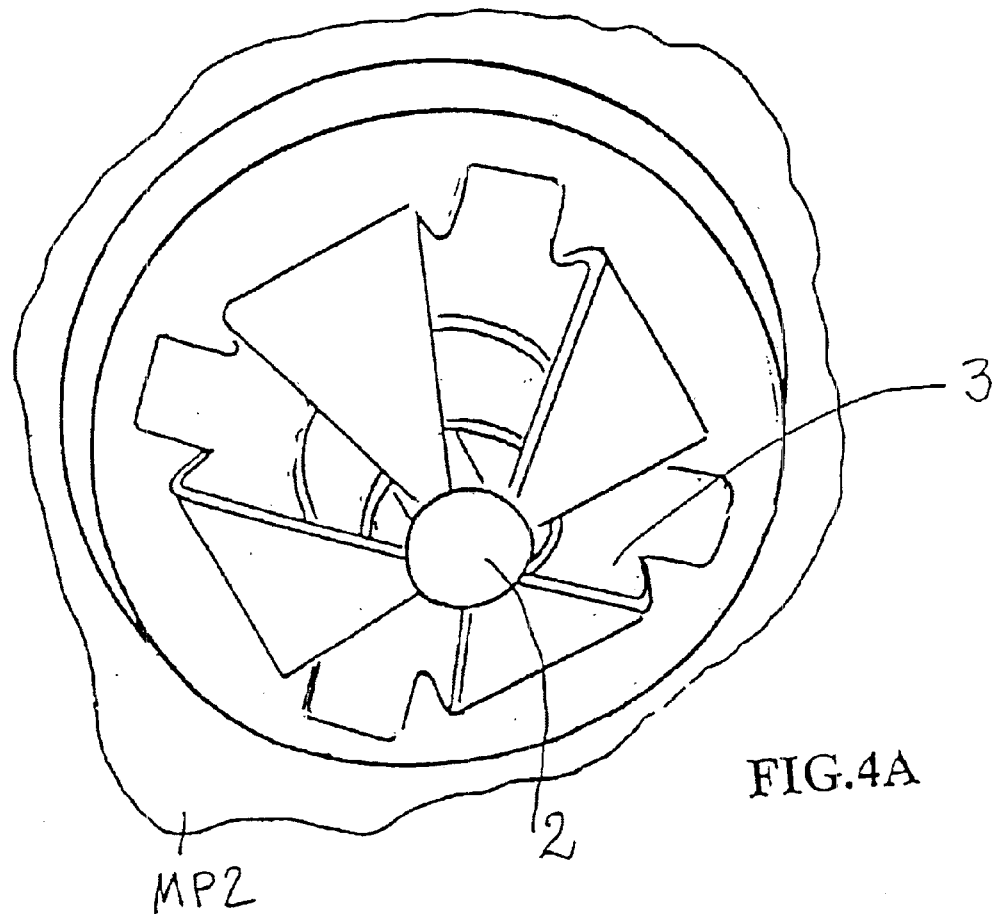
FIGS. 4A and 4B are perspective drawings of a retaining-spring arrangement which is located on the underside of a vibration-damping ring connected to the second component.
Figure 4B:
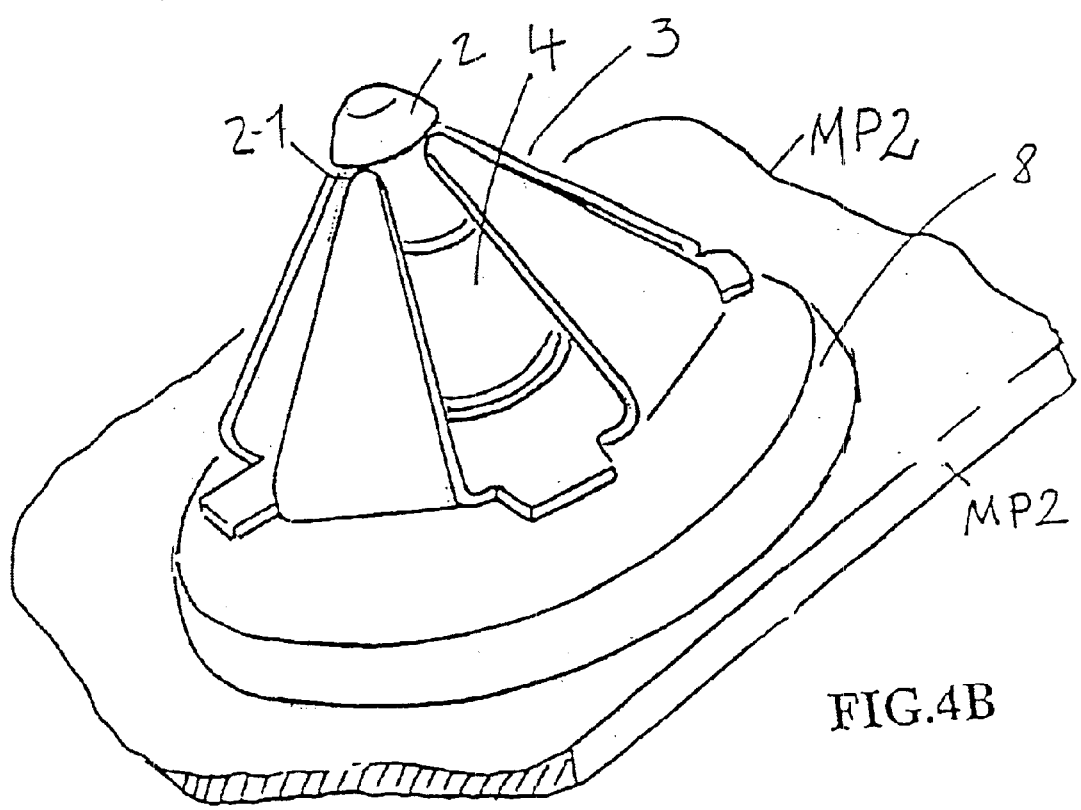

FIGS. 4A and 4B show perspective drawings of the retaining-spring arrangement 3 which is located on the underside of a vibration-damping ring 8 (See FIG. 8) connected to the second component MP2.

The retaining bolt 2 passes through the bush 7 on which the vibration-damping ring 8 is located. The base part 3B of the retaining-spring arrangement 3 lies against the underside of the vibration-damping ring 8. The ends of the free leaf-spring arms engage the retaining groove 2-1 of the retaining pin 2. During a movement in a direction R, the disengaging element 4 would widen the ends of the free leaf-spring arms from their engagement position, thereby releasing the connection between the two components.

Figures 5A, 5B:
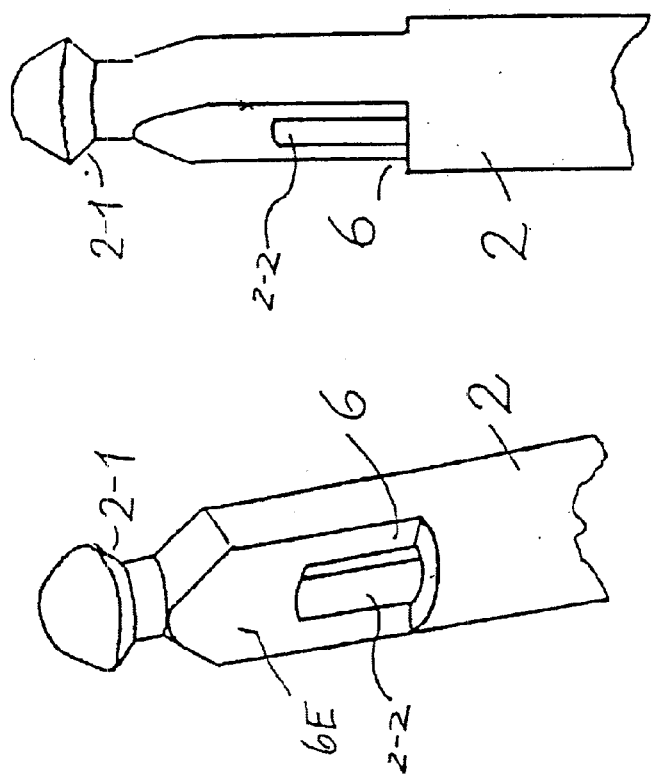
FIGS. 5A and 5B are perspective partial drawings of the retaining bolt with lateral recesses and with an axial hole to receive the detent pin.

FIGS. 5A and 5B show perspective partial drawings of the retaining bolt 2 with lateral recesses 6 and with an axial hole 2-2 to receive the detent pin 5.

In the variant of the retaining bolt 2 shown in FIG. 5A and FIG. 5B, these lateral recesses are milled from the outside and an imaginary milling plane 6E intersects the area of the axial hole 2-2 for the detent pin 5. In this way it is ensured that the detent pin 5, arranged within the axial hole 2-2, projects partially into this recess space 6 so that parts of its front surface can actuate the disengaging element 4 (see also descriptions of FIGS. 7A and 7B).

FIG. 6 shows a perspective drawing of the retaining pin 2 with disengaging element 4 connected to the first component MP1.

As mentioned above, the bolt 2 is guided in the bush 10 which is located in an opening of the first component MP1. The retaining bolt 2 can be pressed in direction R against the force of the spring 13 (see FIG. 1). This is especially beneficial when bolt 2 is intended to "lock" into the retaining-spring arrangement 3 (see FIG. 4A or FIG. 4B).

The detent pin 5 which is movable in the axial direction of the retaining bolt 2 can remain permanently located in the hole 2-2 of the bolt 2. However, it is also possible for the detent pin 5 to be introduced as a tool only temporarily into this hole 2-2 when the connection arrangement is released.

The disengaging element 4 which is located movably on the bolt 2 has the shape of a hollow cylinder whose upper part is configured and/or deformed to correspond to the recess spaces 6 of the bolt 2.

This deformation ensures that the disengaging element 4 cannot slip off the bolt 2. The pressed-in areas of the element 4 function as stops in case of movement within the recess area and ensure that the disengaging element 4 can be actuated and/or engaged by the detent pin 5, as described in more detail in relation to FIGS. 7A and 7B.

Figure 7A:
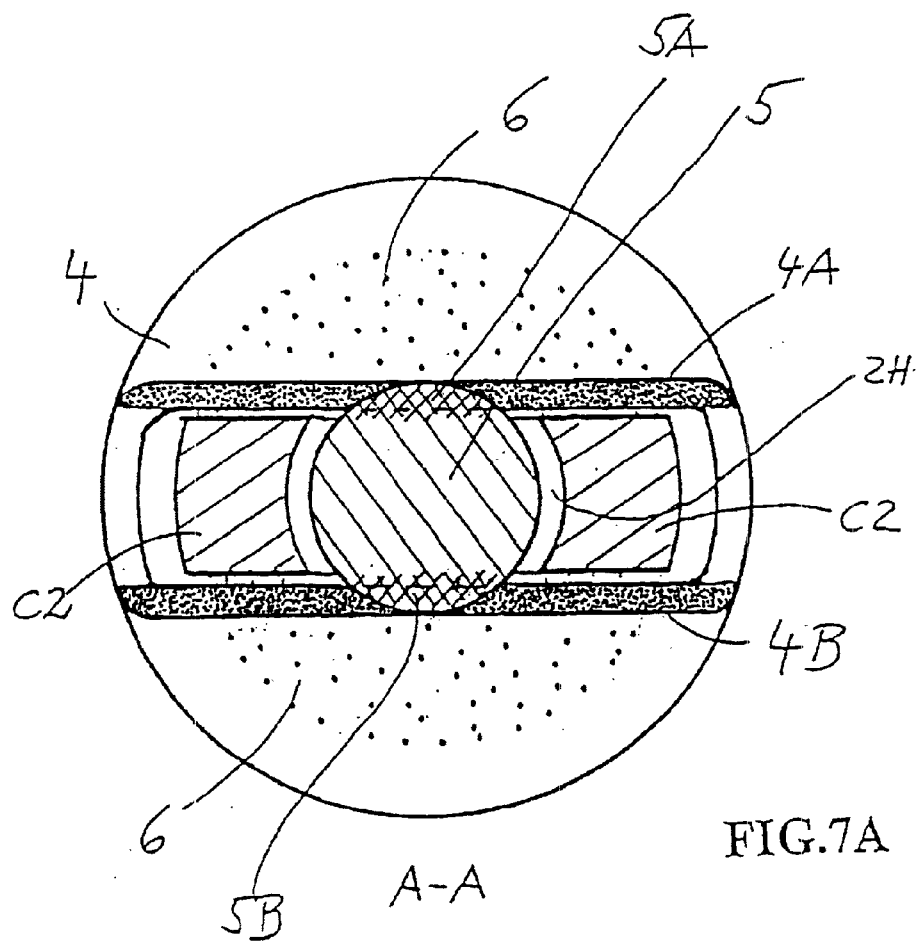
FIG. 7A is a sectional view through the arrangement shown in FIG. 6, showing the actuation of the disengaging element by the detent pin.

FIG. 7A shows a sectional view through the arrangement shown in FIG. 6, showing the actuation of the disengaging element 4 by the detent pin 5. The section plane A—A viewed in a direction F runs parallel to the plane of component MP1. The planes of the section of the retaining bolt 2 are shaded diagonally and marked C2. The axial hole 2-2 (in the retaining bolt 2) is marked as 2H, the detent pin is labeled 5, the intended recess space 6 is so labeled, and the disengaging element is marked as 4.

The parts 5A and 5B of the detent pin 5 projecting into the recess space 6 are cross-hatched. The upper edges of the disengaging element 4 pressed into the recess space 6 is marked as 4A and 4B and is also illustrated.

The disengaging element 4 can be actuated by the detent pin 5 where the cross-hatched surfaces of the detent pin 5 meet and/or engages the upper edge 4A and 4B of the disengaging element 4.

Figure 7B:
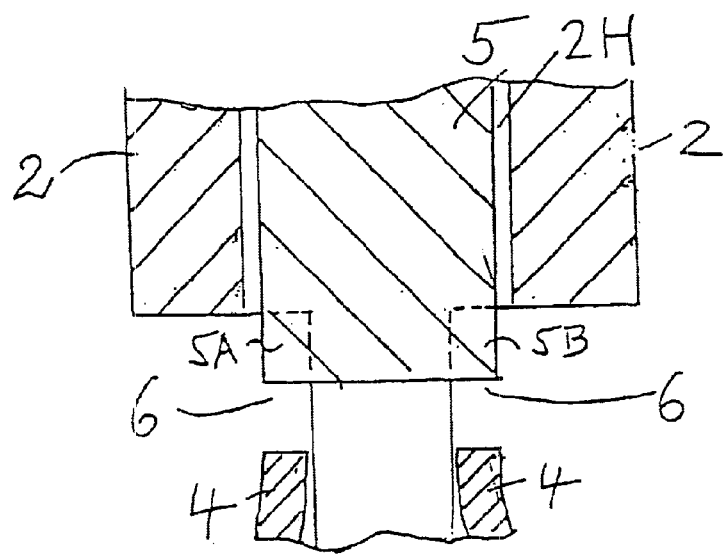
FIG. 7B is a partial sectional view through the arrangement shown in FIG. 3A, showing the actuation of the disengaging element by the detent pin.

FIG. 7B shows a partial sectional view through the arrangement shown in FIG. 3A, showing the actuation of the disengaging element 4 by the detent pin 5. The section plane is marked as Z—Z, the viewing direction as Y. The detent pin 5 is located movably in the axial hole 2H of bolt 2. Parts 5A and 5B of the detent pin 5 project into the recess space 6 of the bolt 2. When the detent pin 5 is moved, the surfaces of their front edges contact the upper edges of the disengaging element 4 which are arranged in the recess spaces 6, thereby causing element 4 to move.

FIG. 8 shows a perspective drawing of the vibration-damping ring 8. It is manufactured of vibration-damping materials, such as rubber or plastic. However, silicone is a preferred material.

The vibration-damping effect is produced by the elasticity of the material and the ability of the narrow-necked bulge to vibrate, in which a groove N is located. This groove N serves to receive the second component (marked as MP2 in FIG. 1) by encircling the edge of a hole in the second component MP2. The vibration-damping ring 8 (e.g., made of rubber) is joined to the component MP2 (which may be made of metal) by any known mechanism and is preferably joined by vulcanization.

Figure 9:
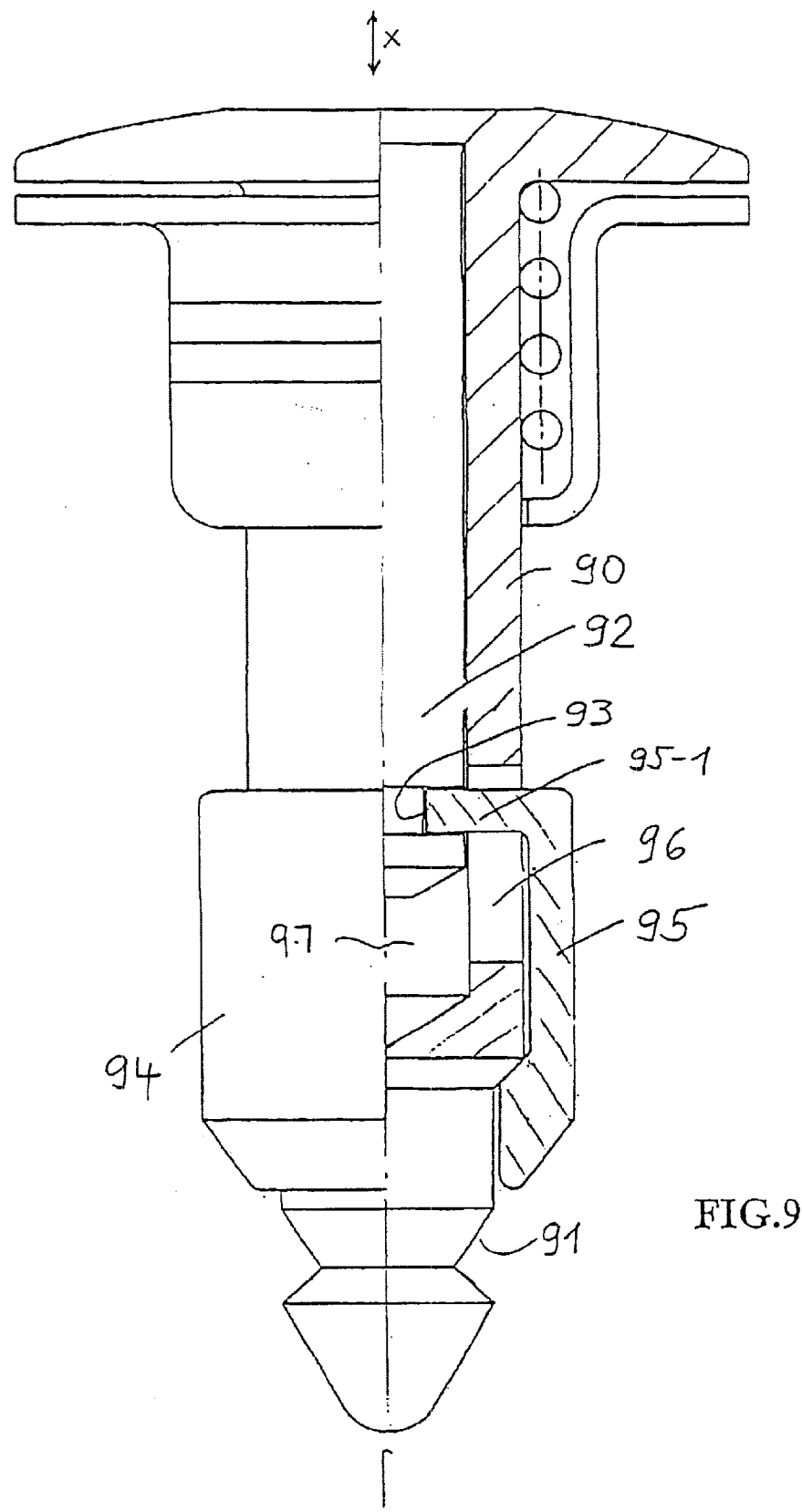
FIG. 9 is a partial sectional view of another variant of the connection arrangement according to the invention, with a retaining bolt, a detent pin and a disengaging element having a spring hook.

FIG. 9 shows a partial sectional view of another variant of the connection arrangement according to the invention. In this embodiment, there is provided a retaining bolt 90, a detent pin 92, and a disengaging element 94 with spring hooks 95/95-1.

This variant of the connection arrangement according to the invention, i.e. that the detent pin 92 in the retaining bolt 90 actuates the disengaging element 94 indirectly to widen the retaining-spring arrangement (not shown) is similar to and/or functions similarly to the variant according to FIG. 1.

For reasons of simplicity, the two components being connected are therefore not shown.

The retaining bolt 90 has a ring-shaped retaining groove 91 for the engagement of the ends of the leaf-spring arms (see e.g., FIG. 1) of the retaining-spring arrangement 3. The detent pin 92 is guided axially in an axial opening 97 in the retaining bolt 90. This detent pin 92 has a ring-shaped engagement groove 93. The disengaging element 94 is located on the retaining bolt 90 so that it can move in a direction X. This disengaging element 94 has two so-called spring hooks 95 arranged opposite one another, whose angled ends 95-1 project through the window-like openings 96 in the wall of the retaining bolt 90 and lock into the engagement groove 93.

When the detent pin 92 moves in a direction X, the disengaging element 94 also moves in the same direction through the rigid connection created by the spring hooks 95 in order to widen the ends of the leaf-spring arms of the retaining spring arrangement 3 (see e.g., FIG. 1) to separate the two components previously connected with one another.

Figures 10, 11:
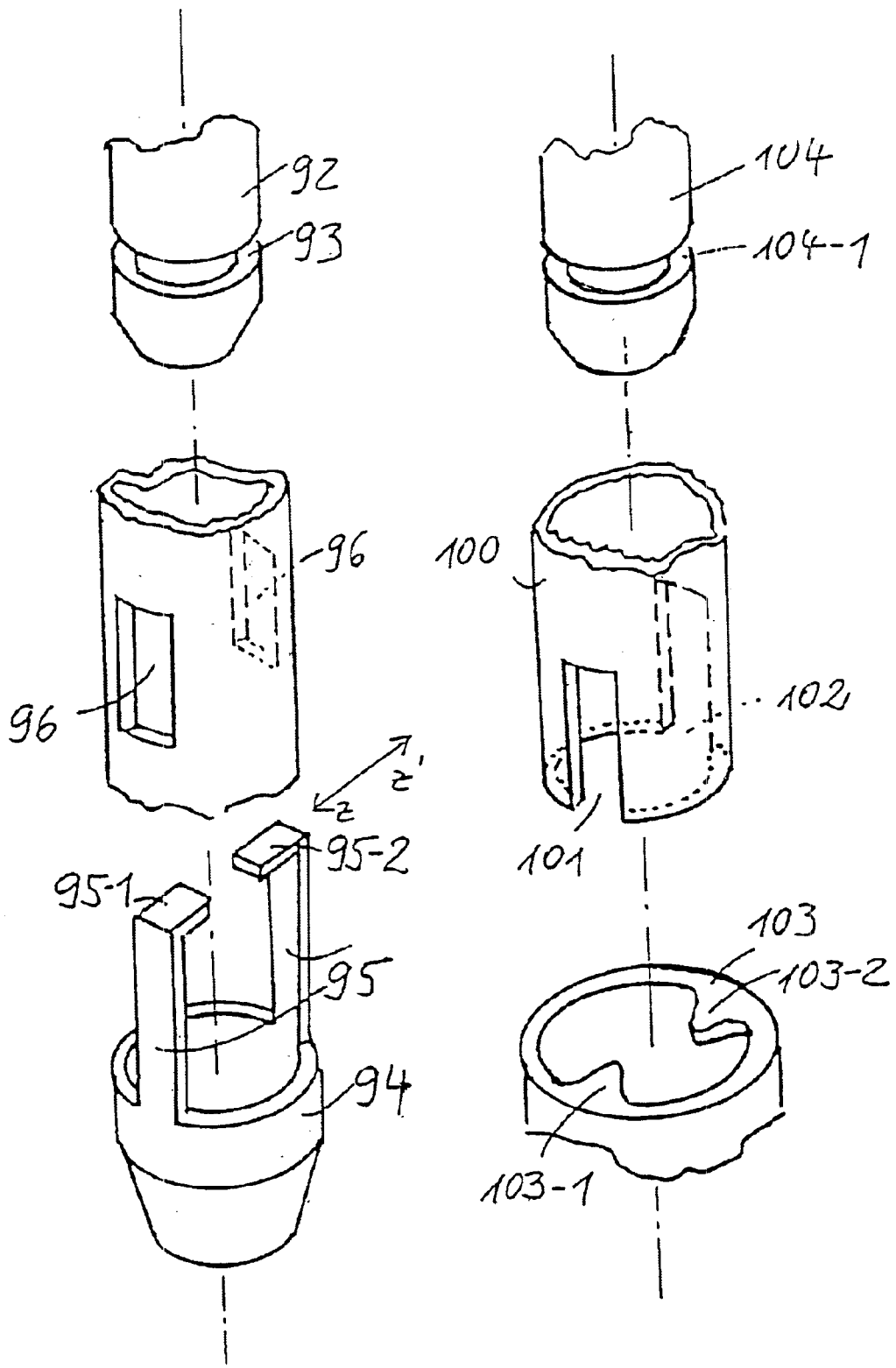
FIG. 10 is a partial schematic perspective explosion diagram of the connection arrangement according to FIG. 9.
FIG. 11 is a partial schematic perspective explosion diagram of another variant of the connection arrangement according to the invention, with a retaining bolt, a detent pin, and a ring-shaped disengaging element having projections pointing inwardly.
Figure 12A:
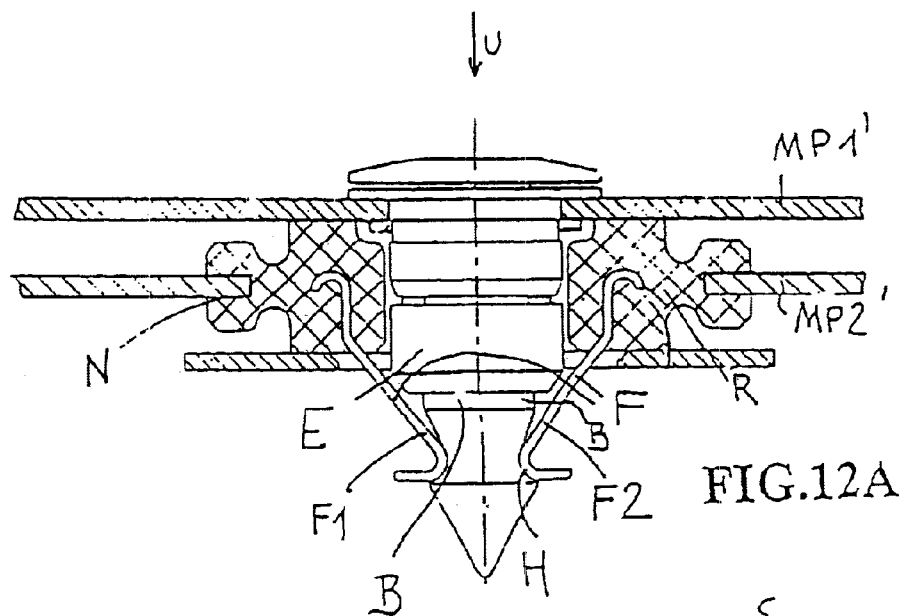
FIGS. 12A, 12B, 12C are drawings of a prior art connection arrangement having a retaining bolt and a detent pin which is fixed by way of a transverse ridge to a disengaging element located movably on the retaining bolt.
Figure 12B:
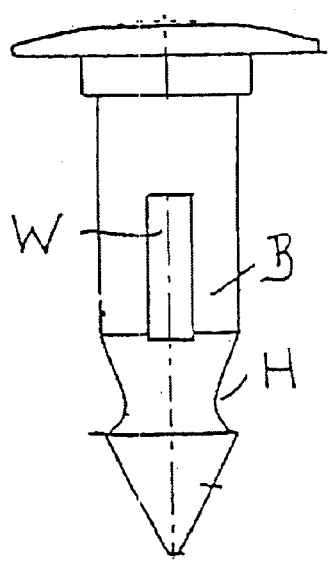
Figure 12C:
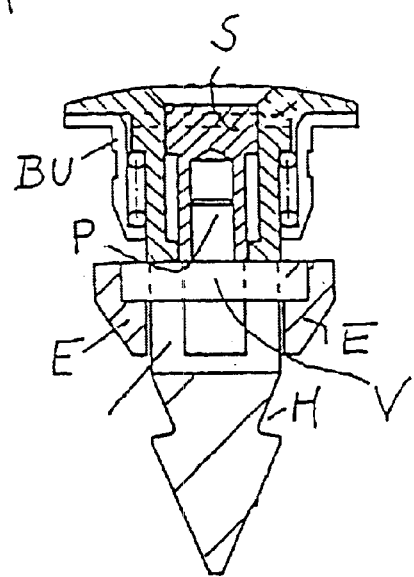

FIG. 10 illustrates, in simplified form, a process for the assembly of pin 92 with the element 94, i.e., FIG. 10 shows a partial schematic perspective explosion diagram of the connection arrangement according to FIG. 9.

The reference symbols in FIG. 9 are the same as those in FIG. 10. The spring hooks 95 are able to spring in both directions Z and Z'. This makes possible an assembly wherein the hook ends 95-1 and 95-2, in their assembled state, project through the window-like openings 96 in the wall and lock into the engagement groove 93. Following this, the arrangement can be connected or released as often as required. The removal of the spring hooks 95 from their "locked position" is no longer necessary for this.

The disengaging element 94 with the spring hooks 95 can be made of any useful material and is preferably made of plastic (e.g., by injection molding).

FIG. 11 shows a partial schematic perspective explosion diagram of another variation of the connection arrangement according to the invention, with a retaining bolt 100, a detent pin 104, and a ring-shaped disengaging element 103 with projections 103-1 and 103-2 pointing inwardly.

In this variant of the connection arrangement according to invention, whose function should be regarded as similar to that of FIG. 1 and FIG. 9, the retaining bolt 100 has no window-like openings, but instead, slots 101, 102, continuing to the end of the retaining bolt.

The disengaging element 103 has projections 103-1 and 103-2 pointing inwardly which, in the assembled state, project through slots 101, 102 and are held in the engagement groove 104-1 of the detent pin 104.

The connection arrangement according to the invention also includes variants where the disengaging element has projections which project through the openings in the wall of the retaining bolt up to the area of the hole in the retaining bolt for the detent pin. Here, the projections of the disengaging element can be actuated by the detent pin itself, e.g. by its front surface.

In addition, the connection arrangement according to the invention also includes variants wherein the detent pin or the disengaging element have projections of any form which project into the recess space of the retaining-bolt wall, where they act on one another to transmit the movement of the detent pin to the disengaging element.

All the connection arrangements according to the invention have in common that the disengaging element is not permanently attached ("attached" in the sense of not being separable) to the detent pin. A locking connection, e.g. through the engagement of spring hooks in the engagement groove according to FIG. 10, would be considered separable, even if no use were made of this possibility.

Finally, it should be noted that the invention contemplates a connection arrangement which may or may not employ the vibration-damping ring 8.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A connection arrangement for detachably connecting a first component with a second component, the first and second components having aligned openings, the arrangement comprising:

a retaining bolt including an internal opening, at least one side wall opening and an external ring-shaped retaining groove, the retaining bolt being adapted to be connected to the first component;

a retaining-spring arrangement having at least one leaf-spring arm and being adapted to be connected to the second component;

the ring-shaped retaining groove of the retaining bolt being adapted to extend through the aligned opening of the second component;

a free end of the at least one leaf-spring arm being engagable with the ring-shaped retaining groove;

a movable disengaging element being adapted to disengage the at least one leaf-spring arm from the retaining groove of the retaining bolt; and a detent pin being movably disposed in the internal opening of the retaining bolt and being engagable with the disengaging element via the at least one side-wall opening, wherein the disengaging element is at least one of movable independently of the detent pin and separable from the detent pin.

2. The arrangement of claim 1, wherein a portion of the detent pin is adapted to directly engage a portion of the disengaging element in the area of the side-wall opening.

3. The arrangement of claim 1, wherein the detent pin is adapted to engage a portion of the disengaging element which extends within the internal opening of the retaining bolt.

4. The arrangement of claim 1, wherein an end the detent pin is adapted to project through the side-wall opening.

5. The arrangement of claim 4, wherein a portion of the detaching element projects into the internal opening of the retaining bolt via the side-wall opening.

6. The arrangement of claim 5, wherein the disengaging element comprises a deformed hollow cylinder.

7. The arrangement of claim 1, wherein the retaining-spring arrangement comprises a base part and at least two leaf-spring arms extending therefrom, each of the at least two leaf-spring arms being tapered towards the ring-shaped retaining groove and being engagable via the disengaging element.

8. The arrangement of claim 7, wherein the base part comprises projections which extend outwardly and which are adapted to extend over the aligned opening of the second component.

9. The arrangement of claim 1, wherein the retaining-spring arrangement comprises a single piece construction.

10. The arrangement of claim 1, wherein the retaining-spring arrangement is formed from spring-steel plate.

11. The arrangement of claim 1, further comprising a bushing arranged in a central opening of the retaining-spring arrangement.

12. The arrangement of claim 11, wherein the bushing comprises at least one flange or shoulder.

13. The arrangement of claim 1, further comprising a vibration-damping ring.

14. The arrangement of claim 13, wherein the vibration-damping ring comprises an elastic material.

15. The arrangement of claim 13, wherein the vibration-damping ring is mounted on the aligned opening of the second component via a peripheral groove.

16. The arrangement of claim 13, further comprising a bushing arranged in a central opening of the vibration-damping ring, the bushing being adapted to secure the retaining-spring arrangement to the second component.

* * * * *